April 24, 1928.
L. C. FIELD
1,667,347
CHAIN SAW
Filed May 25, 1927        2 Sheets-Sheet 1
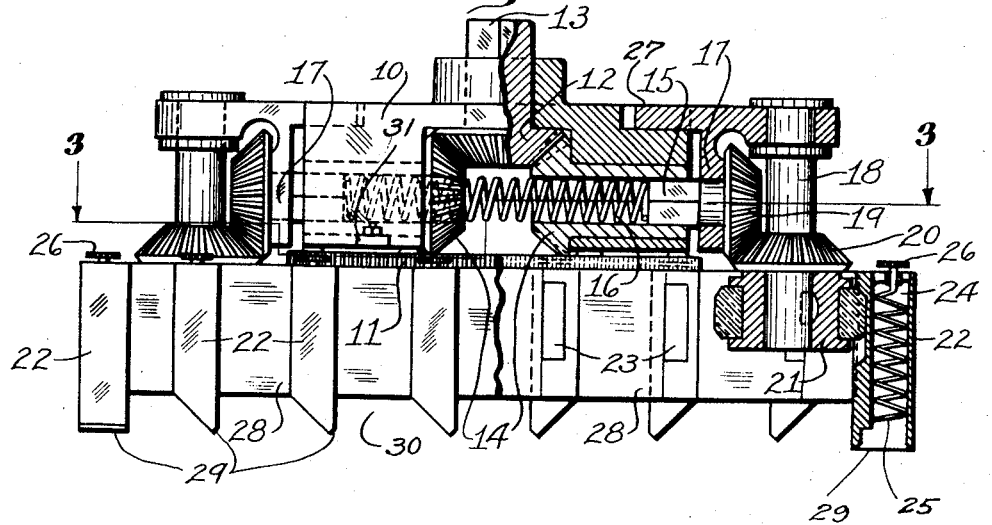
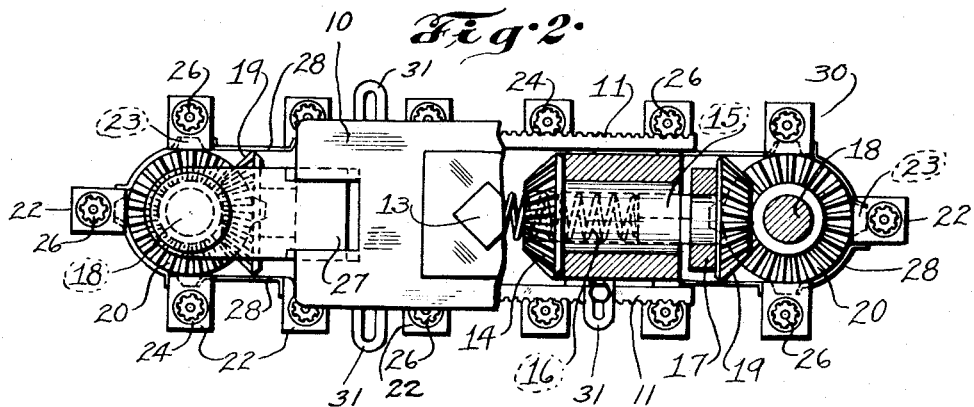
Inventor
Lee C. Field
By Adam E. Fisher
Attorney April 24, 1928.
L. C. FIELD
CHAIN SAW
Filed May 25, 1927
1,667,347
2 Sheets-Sheet 2
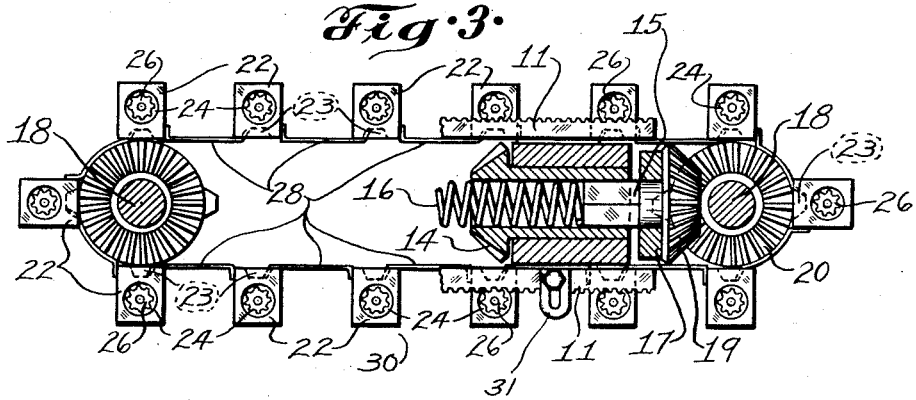
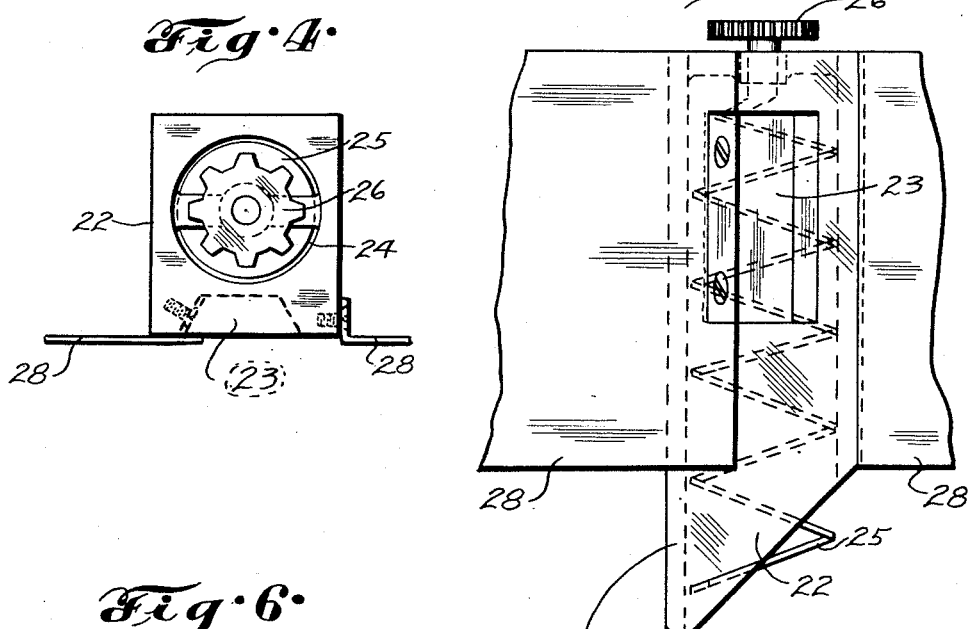
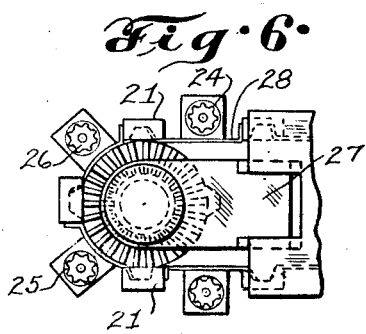
Inventor
Lee C. Field
By Adam E. Fisher
Attorney Patented Apr. 24, 1928.

1,667,347

UNITED STATES PATENT OFFICE.

LEE C. FIELD, OF CINCINNATI, OHIO.

CHAIN SAW.

Application filed May 25, 1927. Serial No. 194,063.

My invention relates to chain saws and more particularly to that class of saws in which the cutting teeth are connected together to form an endless flexible chain which is carried over sprockets through which power is transmitted to drive the chain of teeth.

The principal object of my invention is to provide such a saw adapted to cut in a plane right angularly to the plane of the sprockets driving the saw.

Another object is to provide a means whereby the teeth of the saw may be continuously kept clean of shavings in such a manner that the said shavings are removed from the surface of the work as well as from the cutting points of the teeth.

Another object is to provide an improved means for adjusting the tension of the saw.

Another object is to provide a means for adapting the saw for cutting various sizes and shapes of holes and recesses in the work.

Another object is to provide such a saw adapted to cut to any desired depth in the work so as to provide a recess or rabbeted and finished surface.

Another object is to provide an improved means for furnishing power to the saw.

Another object is to provide an improved construction of such a saw, whereby the teeth may be readily removable for sharpening or replacement.

Another object is to provide such a saw adapted to be manufactured in a small and compact form if desired, whereby the said saw will be adapted to execute small and intricate patterns on the work, such as filigree patterns, etc.

Another object of my invention is to provide different shapes of teeth adapted to be used on the saw, whereby the teeth may be varied to suit the work.

With the above and other objects in view my invention resides in the combination and arrangement of parts hereinafter described and claimed, and more particularly described and illustrated in the accompanying drawings, wherein Figure 1 is a side elevation of my invention with parts thereof shown in section.

Figure 2 is a plan view of Figure 1 with parts thereof shown in section.

Figure 3 is a cross section view along the line 3—3 of Figure 1 showing the cleanout rack and quill gears.

Figure 4 is an enlarged top plan view of one of the teeth showing the cleanout and socket incorporated therewith.

Figure 5 is an inside elevation of the tooth as shown in Figure 4.

Figure 6 is a partial top plan view of my invention showing a modified form of tooth in connection therewith, wherein the cleanouts are employed independently of the sockets.

Referring now more particularly to the drawings, I provide a frame 10 having longitudinally extending racks 11 laterally adjustably positioned on opposite sides thereof. A bevel pinion gear 12 is journaled vertically and medially said frame, as by the square ended pinion shaft 13. Opposing bevel quill gears 14 are journaled longitudinally in said frame 10 and adapted to engage said pinion 12. Pinion shafts 15 are slidably positioned in said quill gears 14 and adapted to rotate therewith. A spring 16 is adapted to extend through said quill gears 14 and engage the said pinion shafts 15 whereby said shafts are urged outwardly of said frame. Said shafts 15 are journaled in bracket bearings 17 adapted to have journaled therein the vertically extending drive shafts 18. Extensions 27 of the brackets 17 are adapted to slidably engage said frame 10. Miter gears 19, 20 are mounted on said shafts 15 and 18. Sprocket wheels 21 are mounted on the lower ends of said shafts 18. By the construction described the bracket bearings 17 and sprockets 21 are movably positioned with respect to the frame 10.

A continuous series of spaced saw teeth indicated generally by 22 are adapted to be engaged by the sprocket wheels 21 as by sockets 23 formed integrally with the vertically extending hollow cutting elements 24 of said teeth. Spiral cleanout flights or helical elements 25 are journaled in said hollow elements 24 and adapted to be rotated therein as by the pinions 26 mounted on said spiral flights 25; said pinions 26 are adapted to engage said racks 11 and be caused thereby to rotate as the teeth 22 are caused to move in alignment with said racks in their passage from one sprocket wheel to the other. As large or smaller sprocket wheels 21 are used in the device, the racks 11 are adapted to be laterally adjusted as by extension brackets 31 so as to maintain the alignment of said teeth 22 with respect to said racks. Flexible elements 28 are extended from one tooth to the other so as to form an endless flexible saw indicated generally by 30, extending around said sprockets 21, whereby said teeth are adapted to cut a swath corresponding to the path of their travel. The said teeth 22 are provided with cutting edges as at 29 on their lower edges, whereby said teeth are adapted to cut their way vertically into the material being worked. Said saw 30 is tensionally adjusted by the movement of said sprockets 21 with respect to the frame 10. Different shapes of teeth may be used with the device, such as square, oblong, oval shaped, or circular, at the option of the person using the device.

In Figure 6 I have illustrated a modification of my invention, wherein the hollow cutting elements 24 are mounted on the flexible elements 28 independently of the sockets 21. Spiral cleanout flights 25 are journaled in the hollow elements 24; the action of the spiral cleanouts is as before described. By combining the modification shown in Figure 6 with the embodiment shown in Figure 1 I am able to cut a wider swath with the saw without increasing the size of the cutting elements.

In use, the device is placed on the surface of the material to be cut, and the teeth 22 caused to travel thereover as by rotating the pinion shaft 13, which in turn drives the pinion shaft 15 thru the quill gears 14, thus driving the sprocket wheels 21 thru the miter gears 19, 20, which in turn engages the teeth 22 as described. As the cutting edges 29 of the cutting elements 24 of the teeth 22 engage the work the material removed therefrom and accumulated in front of the teeth is removed upwardly by means of the helical elements 25. While the racks 11 extend for only a portion of the path of travel of the teeth, such débris as may be accumulated by the teeth when not engaging the racks will be carried along by the teeth until such time as the helical elements are operated by said racks—the distance being relatively short, no difficulty in removing the débris need be expected. The device may be provided with any convenient form of handle or operating means, not here shown.

While I have herein described a certain specific method of constructing and assembling the elements of my invention, it is understood same may be varied in minor details, not departing from the spirit of my invention as defined in the appended claims.

I claim:

1. An endless flexible saw comprising a series of spaced and vertically extending hollow cutting elements; flexible elements adapted to extend from one of said cutting elements to the other; and means for operating said saw.

2. An endless flexible saw comprising a series of spaced and vertically extending hollow cutting elements; flexible elements adapted to extend from one of said cutting elements to the other; sockets positioned on said cutting elements; and means engaging said sockets for the purpose of operating said saw.

3. An endless flexible saw comprising a series of spaced and vertically extending hollow cutting elements; flexible elements adapted to extend from one of said cutting elements to the other; sockets positioned on said cutting elements; helical elements journaled vertically in said cutting elements; means for rotating said helical elements; and means for engaging said sockets for the purpose of operating said saw.

4. An endless flexible saw comprising a series of spaced and vertically extending hollow cutting elements; flexible elements adapted to extend from one of said cutting elements to the other; sockets positioned on said cutting elements; and driving sprocket wheels adapted to engage said sockets in a plane at right angles to the cutting plane of said cutting elements.

5. An endless flexible saw comprising a series of hollow cutting elements in spaced relation; flexible elements adapted to extend from one of said cutting elements to the other; sockets positioned on said cutting elements; and driving sprocket wheels adapted to engage said sockets in a plane at right angles to the cutting plane of said cutting elements.

6. An endless flexible saw comprising a series of hollow cutting elements in spaced relation; flexible elements adapted to extend from one of said cutting elements to the other; sockets positioned on said cutting elements; helical elements journaled interiorly said cutting elements; means for rotating said helical elements; and driving sprocket wheels adapted to tensionally engage said sockets in a plane at right angles to the cutting plane of said cutting elements.

7. A cutting tooth adapted for use in an endless flexible saw, comprising a hollow body having a cutting edge formed on the periphery of one end thereof; a socket formed on said body in a plane transversely thereto; and a helical element journaled interiorly said body and adapted to extend therethrough.

8. In combination with an endless flexible saw and a sprocket wheel adapted to operate said saw, a cutting tooth comprising a hollow body having a cutting edge formed on the periphery of one end thereof; a socket formed on said body and adapted to engage said sprocket wheel in a plane transversely said body; a helical element journaled longitudinally interiorly said body; and means for rotating said helical element.

9. A boring and mortising machine comprising a frame; a driving pinion journaled transversely said frame; opposing hollow sleeve gears journaled longitudinally said frame and adapted to engage said driving pinion; miter gears slidably positioned with respect to said sleeve gears and adapted to rotate therewith; a spring positioned interiorly said sleeve gears and adapted to urge said miter gears outwardly said frame; sprocket wheels adapted to be rotated by said miter gears; and an endless flexible saw adapted to engage said sprocket wheels against the tension of said spring.

10. In a boring and mortising machine as described in claim 9, an endless flexible saw comprising a series of hollow cutting elements in spaced relation; flexible elements adapted to extend from one of said cutting elements to the other; sockets positioned on said cutting elements adapted to engage said driving sprocket wheels in a plane at right angles to the cutting plane of said cutting elements; helical elements journaled interiorly and longitudinally said cutting elements; longitudinally extending racks positioned oppositely said frame; pinions provided said helical elements adapted to engage said racks; and cutting edges formed on the periphery of one of the ends of said cutting elements.

In testimony whereof I affix my signature.

LEE C. FIELD.